United States Patent [19]

Okumoto et al.

[11] Patent Number: 4,860,773

[45] Date of Patent: Aug. 29, 1989

[54] PERFORATING APPARATUS FOR ROD-SHAPED OBJECTS

[75] Inventors: Yutaka Okumoto; Takao Furukawa, both of Tokyo, Japan

[73] Assignee: Japan Tobacco Inc., Tokyo, Japan

[21] Appl. No.: 172,798

[22] Filed: Mar. 28, 1988

[30] Foreign Application Priority Data

May 28, 1987 [JP] Japan .................... 62-129691

[51] Int. Cl.⁴ .................................. A24C 5/60
[52] U.S. Cl. .................. 131/281; 131/282; 219/121.7; 219/121.71
[58] Field of Search ............... 131/281, 282; 219/121.7, 127.71

[56] References Cited

U.S. PATENT DOCUMENTS

| 4,349,719 | 9/1982 | Cashwell et al. | 219/171.7 |
| 4,524,784 | 6/1985 | Seragnoli et al. | 131/281 |
| 4,524,785 | 6/1985 | Seragnoli et al. | 131/281 |
| 4,565,202 | 1/1986 | Seragnoli et al. | 131/281 |
| 4,647,752 | 3/1987 | Mattei et al. | |

FOREIGN PATENT DOCUMENTS

| 2146227 | 4/1985 | United Kingdom | 131/281 |
| 2146228 | 4/1985 | United Kingdom | 131/281 |
| 2196229 | 4/1985 | United Kingdom | 131/281 |
| 2155753 | 10/1985 | United Kingdom | 131/281 |
| 2155754 | 10/1985 | United Kingdom | 131/281 |

Primary Examiner—V. Millin
Assistant Examiner—J. Cheng
Attorney, Agent, or Firm—Nixon & Vanderhye

[57] ABSTRACT

A perforating apparatus according to the invention has a hollow shaft having two open ends, a disc mounted on the hollow shaft and rotated together therewith, a shaft, a plurality of holding arms, a rotating mechanism for rotating each holding arm about the axis of a filter cigarette, a laser generating source, and an optical system. The holding arms are arranged on the periphery of the disc, in the circumferential direction thereof, and hold filter cigarettes such that the filters project from the holding arm. The laser generating source emits a laser beam into the hollow shaft, toward one of its open ends and at a predetermined pulse separation. The optical system has a reflecting mirror which rotates together with the hollow shaft. The reflecting mirror has reflecting surfaces which correspond to the holding arms and reflect the laser beam toward the outer periphery filter. The optical system additionally has a focusing lens for focusing the laser beam on the outer periphery of the filter.

6 Claims, 3 Drawing Sheets

PERFORATING APPARATUS FOR ROD-SHAPED OBJECTS

BACKGROUND OF THE INVENTION

The present invention relates to a perforating apparatus for forming a plurality of holes in the periphery of rod-shaped objects to be arranged at equal intervals and, more particularly, to a perforating apparatus which is suitable for forming a plurality of holes in the outer surface of filters of filter cigarettes.

Some conventional filter cigarettes have a plurality of holes formed in the outer periphery of their filters, these holes being formed at intervals in the circumferential direction of the filter. A smoker smoking this type of filter cigarette therefore inhales a large amount of air introduced into the filter through the holes, together with the cigarette smoke. With the cigarette smoke entering his mouth being diluted with air, the smoker is able to enjoy a lighter, milder taste. Moreover, because the smoke is diluted with air, its temperature is reduced, and thus the amount of harmful substances contained in the smoke is decreased.

A perforating apparatus as disclosed in U.S. Pat. No. 4,647,752 is a known apparatus for forming holes in filters of filter cigarettes. This perforating apparatus has a rotatable disc and a plurality of holding arms which are mounted on the periphery of the disc and spaced apart from one another in the circumferential direction thereof in order to hold individual filter cigarettes supplied thereto as the disc rotates. Therefore, as the disc rotates, the filter cigarettes are conveyed in the circumferential direction of the disc while being held by the holding arms. During conveyance of the filter cigarettes, each holding arm is rotated about the axis of the cigarette it is holding.

The perforating apparatus also has a generating source capable of radiating a laser beam in a pulse-like manner, and an optical system for guiding the laser beam emitted by the generating source to the outer periphery of a filter cigarette held by a holding arm. The optical system includes a single reflecting mirror for reflecting the laser beam and focusing lenses for focusing the laser beam reflected by the reflecting mirror on the outer periphery of the filter.

With the conventional perforating apparatus described above, the filter cigarettes held by the respective holding arms are rotated about their axes by rotation of the holding arms themselves while they are conveyed by rotation of the disc. In this state, when a laser beam is radiated on the outer periphery of the filter in a pulse-like manner, a plurality of holes are formed in the outer periphery of the filter to be arranged in the circumferential direction of the filter at intervals. Thereafter, a perforated filter cigarette is removed from the corresponding holding arm and conveyed to a packaging machine.

In the conventional perforating apparatus described above, a laser beam is sequentially focused on a filter of each filter cigarette while the filter cigarette is conveyed on a circular convey path. Therefore, the reflecting mirror of the optical system must be rotated about an axis of the disc so that each filter is irradiated with the laser beam. The reflecting mirror must be rotated at a large angular speed several times that of the disc so that holes are formed in the whole outer periphery of the filter in the circumferential direction by the laser beam. However, when a difference between the angular speeds of the disc, i.e., a filter cigarette and the reflecting mirror becomes large in this manner, the fall time of each pulse of the laser beam reflected by the reflecting mirror and radiated on the filter is prolonged. Therefore, it is difficult to form holes of a predetermined length on the outer periphery of each filter to be spaced apart from one another by a desired distance. More specifically, each hole formed in the outer periphery of the filter is undesirably elongated at its tail-side portion in the rotating direction of the filter, and an outer appearance of a filter cigarette as a final product is degraded.

The angular speeds of the disc and the reflecting mirror are increased in order to increase productivity of filter cigarettes per unit time, resulting in a large difference between these angular speeds. The larger the difference, the worse the outer appearance of the filter cigarette, and adjacent holes are connected to each other in a worst case.

In addition, when the angular speed of the reflecting mirror is increased, the load applied on the drive mechanism of the reflecting mirror is increased.

SUMMARY OF THE INVENTION

It is an object of the present invention to provide a perforating apparatus which can form a plurality of holes in the outer periphery of rod-shaped objects to be arranged in the circumferential direction of the rod-shaped objects at intervals and in which a productivity of rod-shaped objects per unit time can be easily increased while a constant distance between the holes and a constant shape of the holes are maintained.

The perforating apparatus according to the present invention has a rotatable hollow shaft having two open ends, a disc mounted on the hollow shaft to rotate therewith, a plurality of holding arms, arranged on the periphery of the disc to be spaced apart from one another in the circumferential direction of the disc at equal intervals, capable of holding rod-shaped objects and rotatable about axes of the rod-shaped objects, a generating source for emitting a circular laser beam concentric with the axis of the hollow shaft toward the first open end of the hollow shaft in a pulse-like manner, and an optical system for guiding the laser beam toward the rod-shaped objects. The optical system includes a reflecting mirror opposing the first open end of the hollow shaft and rotated with the hollow shaft. The reflecting mirror has a plurality of reflecting surfaces. When the disc is rotated, the reflecting surfaces of the reflecting mirror are rotated about the axis of the hollow shaft in synchronism with the corresponding holding arms, and distribute and reflect the circular laser beam toward the rod-shaped objects of the respective holding arms. The optical system further includes focusing lens means inserted in the laser beam path from the generating source to the respective hollow arms. The focusing lens means focuses the laser beam on the outer periphery of each rod-shaped objects.

In the perforating apparatus of the present invention, the respective reflecting surfaces of the reflecting mirror are rotated about the axis of the hollow shaft in synchronism with the corresponding holding arms, i.e., the rod-shaped objects. Therefore, even during rotation of the disc, a rod-shaped objects and the corresponding reflecting surface of the reflecting mirror always oppose each other, and thus no difference occurs between the angular speeds of the rod-shaped object and the corresponding reflecting surface. As a result, when the laser beam from the generating source is focused on the outer periphery of the rod-shaped objects in a pulse-like manner through the focusing lens means and the corresponding reflecting surface of the reflecting mirror, the pulse fall time can be determined only by the generating source. As a result, the distance between the holes formed in the rod-shaped objects can be maintained constant as well as the length and shape, resulting in a high precision working. In addition, with the structure of the perforating apparatus of the present invention, even if the angular speed of the disc, i.e., the convey speed of the rod-shaped objects is increased, no angular speed difference occurs, as described above. As a result, the productivity of rod-shaped objects per unit time can be increased while the distance between the holes is maintained constant with high precision.

DETAILED DESCRIPTION OF THE PREFERRED EMBODIMENT

Figure 1:
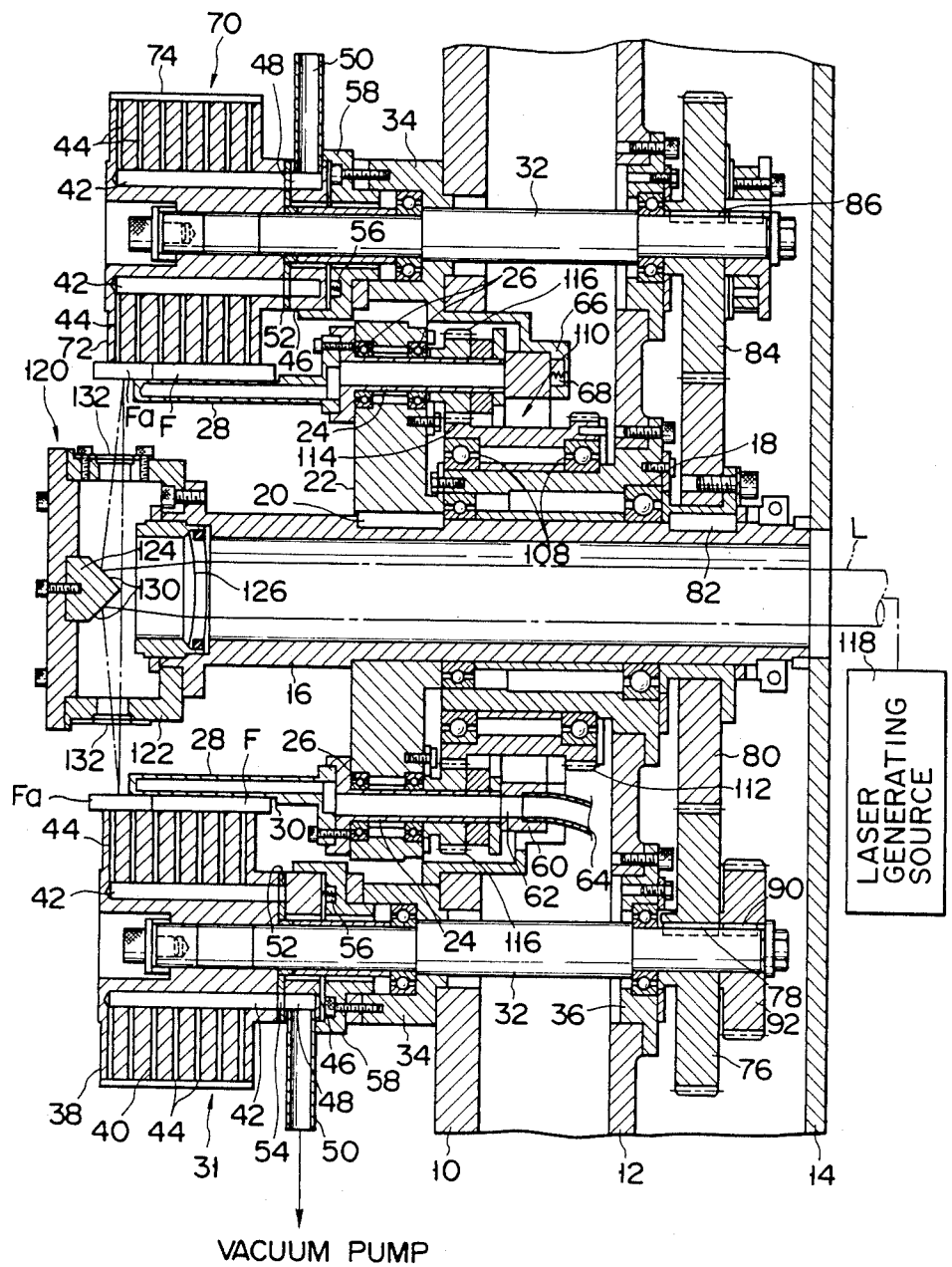
FIG. 1 is a sectional view of a perforating apparatus taken along the line I—I of FIG. 2.

Referring to FIG. 1, a perforating apparatus has three support plates 10, 12, and 14 extending parallel to each other at predetermined intervals. Hollow shaft 16 extends through plates 10 and 12 and is rotatably supported by plates 10 and 12 through bearing unit 18. Two ends of drive shaft 16 are open.

Disc 22 is mounted through key 20 on a portion of drive shaft 16 projecting from plate 10 at one side. Therefore, hollow shaft 16 and disc 22 can be integrally rotated.

For example, twelve hollow shafts 24 are arranged on the periphery of disc 22 to be spaced apart from one another in the circumferential direction of disc 22 at equal intervals and parallel to the axis of disc 22. Each shaft 24 is rotatably supported by disc 22 through a pair of bearings 26. Each shaft 24 projects from two side surfaces of disc 22, as apparent from FIG. 1.

Holding arm 28 is mounted on one end of each hollow shaft 24 projecting from disc 22 opposite to support plate 10. Each arm 28 extends parallel to shaft 24. Groove 30 having a semicircular section (see FIG. 2) is formed in each arm 28 to extend in the longitudinal direction. Groove 30 can receive filter cigarette F as a rod-shaped objects and hold it therein. Therefore, when disc 22 is rotated while cigarette F is held in groove 30 of arm 28, cigarette F is conveyed on an imaginary convey path along a circle having the axis of hollow shaft 16 as its center. When filter cigarette F is received in groove 30 of arm 28, the axis of cigarette F and that of shaft 24 coincide with each other, as apparent from FIG. 1.

Feed section 31 for feeding cigarettes F to respective holding arms 28 of disc 22 is arranged in the vicinity of the periphery of disc 22. Feed section 31 has roller shaft 32 which is arranged at the outward side of disc 22 and extends through plates 10 and 12 to be parallel to hollow shaft 16. Roller shaft 32 is rotatably supported by plates 10 and 12 through bearing units 34 and 36. One end of shaft 32 projects from plate 10 outward in the same manner as hollow shaft 16.

Feed roller 38 is mounted on the projecting end of roller shaft 32. For example, eight feed grooves 40 are formed in the outer surface of roller 38 to be spaced apart from one another in the circumferential direction of feed roller 38. These feed grooves 40 extend in the axial direction of roller shaft 32 and can respectively receive cigarettes F. Feed roller 38 is rotated in a direction opposite to the rotational direction of disc 22, so as to be in rolling contact with the circular imaginary convey path described above. The peripheral speed of roller 38 is set to be the same as the convey speed of cigarette F on the imaginary convey path. Therefore, disc 22 and feed roller 38 are rotated such that their holding arms 28 and feed grooves 40 coincide with each other at first rotational angle position P1 in the circumferential directions of disc 22 and roller 38, as shown in FIG. 2.

Cigarette F can be supplied to each filter groove 40 of filter roller 38 by a loading mechanism (not shown). More specifically, when each groove 40 of roller 38 reaches lowest position L, the loading mechanism can supply cigarette F to it.

Figure 2:
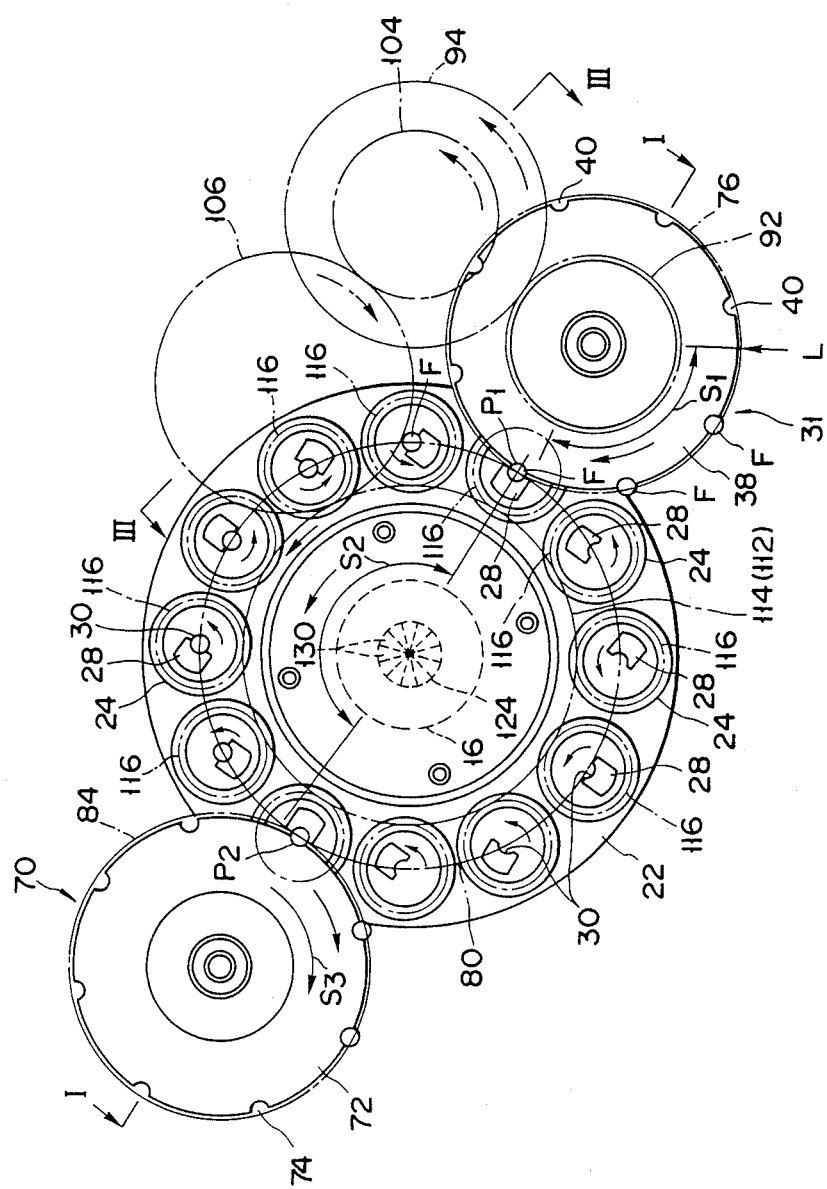
FIG. 2 is a front view of the perforating apparatus shown in FIG. 1.

Cigarette F supplied from the loading mechanism to feed groove 40 of feed roller 38 is reliably held in groove 40 without falling while it is conveyed from lowest position L to a position immediately before first rotational angle position P1, i.e., during convey interval S1 shown in FIG. 2, by rotation of filter roller 38. For this purpose, axial holes 42 corresponding to respective feed grooves 40 are formed in roller 38 to be parallel to grooves 40. Feed grooves 40 and corresponding holes 42 are connected to each other through a plurality of radial holes 44 formed in roller 38. Nonrotatable connection ring 46 is arranged between roller 38 and bearing unit 34 to surround roller shaft 32. Arcuated groove 48 is formed in an end face of ring 46 on the feed roller 38 side. When a given feed groove 40 of roller 38 is located within convey interval S1, groove 48 can be connected to the groove 40 through holes 42 and 44. More specifically, arcuated groove 48 is formed in the end face of connection ring 46 to correspond to convey interval S1. Connection pipe 50 having an end communicated with arcuated groove 48 is connected to the outer periphery of ring 46. The other end of pipe 50 is connected to a vacuum pressure source (not shown), e.g., a vacuum pump. Furthermore, seal ring 52 is fixed to ring 46 such that it is arranged between feed roller 38 and ring 46. Seal ring 52 has an arcuated hole 54 which can be connected to each axial hole 42 of feed roller 38. Furthermore, springs 56 are arranged between ring 46 and bearing unit 34 to urge rings 46 and 52 toward feed roller 38. Springs 56 are arranged in urging ring 58 fixed to bearing unit 34. Therefore, feed roller 38 is rotated while it is hermetically sealed and in slidable contact with seal ring 52.

Therefore, when the vacuum pump is driven and feed groove 40 is located in convey interval S1, air in feed groove 40 is drawn through axial hole 42, arcuated groove 48, and connection pipe 50. As a result, cigarette F can be reliably supplied to groove 40 of feed roller 38 from the loading mechanism. Furthermore, cigarette F in groove 40 is conveyed in convey interval S1 while it is stably held.

Each holding arm 28 has a hollow tubular shape communicating with hollow shaft 24, as shown in FIG.

1, in order to receive cigarette F from feed roller 38. A plurality of openings are formed in the bottom of groove 30 of each holding arm 28 and communicate with the interior of arm 28. The other end of hollow shaft 24 can be connected to connection pipe 64 through arcuated groove 62 of connection ring 60. Arcuated groove 62 has a similar function to that of connection ring 46 described above. Pipe 64 is connected to the vacuum pump in the same manner as connection pipe 50 described above. As shown in FIG. 1, ring 60 surrounds bearing unit 18 of hollow shaft 16 and is urged toward the other end of each hollow shaft 24 by springs 68. These springs 68 are arranged in urging ring 66 in the same manner as springs 56. The other end of each hollow shaft 24 is hermetically sealed and in slidable contact with the end face of connection ring 60. The range of arcuated groove 62 in the circumferential direction of connection ring 60 will be described later.

The interior of each holding arm 28 can be connected to the vacuum pump through hollow shaft 24, connection ring 60, and connection pipe 64, as described above. Therefore, groove 30 of each arm 38 can suck cigarette F in the similar manner to that of feed groove 40 of feed roller 38. When cigarette F held in given groove 40 of roller 38 reaches first rotational angle position P1 described above, groove 30 of holding arm 28 corresponding to given groove 40 faces outward in the radial direction of disc 22. In this case, when air in groove 30 in holding arm 28 is drawn by suction, cigarette F in groove 40 is drawn into groove 30 in corresponding arm 28. In other words, cigarette F is transferred to groove 30 of arm 28 from groove 40.

It must be noted that, when filter cigarette F is supplied to each holding arm 28 from feed roller 38 in this manner, it is held in arm 28 while its filter Fa projects from arm 28, as shown in FIG. 1. Then, cigarette F held by arm 28 is conveyed on the imaginary convey path by the rotation of disc 22.

Pickup section 70 is arranged in the vicinity of the periphery of disc 22 to be located opposite to feed roller 38 with respect to the direction of diameter of disc 22. Pickup section 70 has substantially the same arrangement as that of feed section 31 described above. The members having functions identical to those of the members of feed section 31 are denoted by the same reference numerals and a detailed description is omitted. Only members of pickup section 70 that are different from those of feed section 31 will be described.

Pickup section 70 has pickup roller 72 in place of feed roller 38. Pickup roller 72 has pickup grooves 74 similar to feed grooves 40. Roller 38 and disc 22 are rotated such that holding arms 28 and corresponding feed grooves 40 coincide with each other at first rotational angle position P1 shown in FIG. 2 as described above. In contrast to this, pickup roller 72 and disc 22 are rotated such that holding arms 28 and corresponding pickup grooves 74 coincide with each other at second rotational angle position P2 of disc 22, as shown in FIG. 2. Second rotational angle position P2 is separated from first rotational angle position P1 by 180° in the circumferential direction of disc 22.

Cigarette F is supplied to holding arm 28 at first rotational angle position P1 and is then conveyed to second rotational angle position P2 along the imaginary convey path by the rotation of perforating disc 22. When cigarette F is located at second rotational angle position P2, it is transferred to a single pickup groove 74 of pickup roller 72 from holding arm 28 and is held in it.

Then, cigarette F in groove 74 is conveyed by the rotation of roller 72, and is supplied to a next packaging machine (not shown).

When cigarette F supplied to each holding arm 28 is to be conveyed by rotation of disc 22, it is drawn and held in groove 30 of arm 28 so that it can be reliably held by arm 28. More specifically, arcuated groove 62 of connection ring 60 described above is formed in an arcuated region extending from first to second rotational angle position P1 to P2 along the circumferential direction of disc 22, i.e., a region corresponding to convey interval S2 shown in FIG. 2. Arcuated groove 48 of connection ring 46 which cooperates with pickup roller 72 is provided to extend from second rotational angle position P2 for predetermined convey interval S3 in the rotational direction of roller 72. More specifically, convey interval S3 is the region extending from second rotational angle position P2 to an unloading mechanism (not shown).

A drive mechanism for disc 22 and feed and pickup rollers 38 and 72 described above will be described. Gear 76 rotated by a drive source (not shown) is mounted on the other end of roller shaft 32 of feed roller 38 by means of key 78. Gear 80 meshed with gear 76 is mounted on the other end of hollow shaft 16 through key 82. Gear 84 meshed with gear 80 is mounted on the other end of roller shaft 32 of pickup roller 72. Therefore, with the drive mechanism described above, when gear 76 is rotated by the drive source, feed roller 38 is rotated in the direction indicated by an arrow in FIG. 2 through roller shaft 32. When gear 76 is rotated, gear 80 is rotated in a direction opposite to that of gear 76. Therefore, disc 22 is rotated in the direction indicated by an arrow in FIG. 2, i.e., in a direction opposite to that of feed roller 38 through hollow shaft 16. Since gear 84 is also rotated in the direction opposite to that of gear 80 upon rotation of gear 80, pickup roller 72 is rotated in the direction indicated by an arrow in FIG. 2, i.e., in a direction opposite to that of disc 22.

Figure 3:
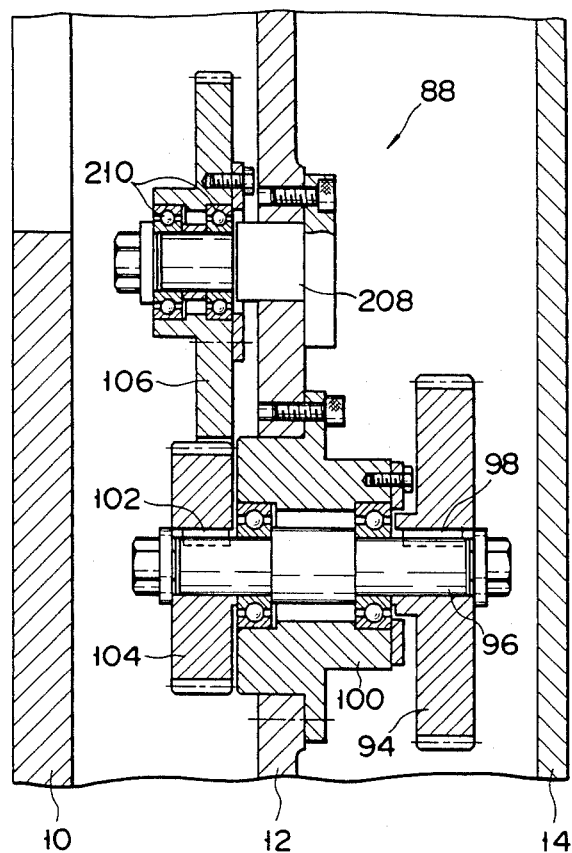
FIG. 3 is a sectional view taken along the line III—III of FIG. 2.

Each holding arm 28 of disc 22 is rotated once about the axis of its hollow shaft 24 while it is moved from first rotational angle position P1 to second rotational angle position P2 upon rotation of disc 22, and is rotated once about the axis of its hollow shaft 24 while it is returned from position P2 to position P1. Rotation of each holding arm 28 described above is performed by rotating mechanism 88. Rotating mechanism 88 is shown in FIGS. 1 to 3. Rotating mechanism 88 has gear 92 which is mounted on the other end of roller shaft 32 of feed roller 38 through key 90 to be close to gear 76, as shown in FIG. 1. Gear 92 is meshed with gear 94 shown in FIG. 3. Gear 92 is not shown in FIG. 3. Gear 94 is mounted through key 98 on one end of shaft 96 extending through plate 12. Shaft 96 is rotatably supported by plate 12 through bearing unit 100. Gear 104 is mounted on the other end of shaft 96 through key 102. Gear 104 is meshed with gear 106. Gear 106 is rotatably mounted, through a pair of bearings 210, on shaft 208 fixed to plate 12.

Referring to FIG. 1, sun gear 110 is mounted on bearing unit 18 of hollow shaft 16 through a pair of bearings 108. Sun gear 110 has a pair of gear portions 112 and 114 spaced apart from each other in the axial direction of hollow shaft 16. One gear portion 112 is meshed with gear 106 (see FIGS. 1 and 3) described above. The other gear portion 114 is meshed with planetary gears 116 respectively mounted on the other ends of respective hollow shafts 24.

With the rotating mechanism described above, when gear 76 of feed roller 38 is rotated, its rotating force is transmitted to gear portion 112 of sun gear 110 through gears 92, 94, 104, and 106, and sun gear 110 is rotated in the same direction as that of disc 22. Since gear portion 114 of sun gear 110 is meshed with planetary gears 116 of respective hollow shafts 24, i.e., of respective holding arms 28, each planetary gear 116 is rotated as well. The rotational frequency of disc 22 is set to be twice that of sun gear 110. Therefore, each planetary gear 116 is rotated counterclockwise as indicated by an arrow shown in FIG. 2. More specifically, each holding arm 28 is rotated counterclockwise in FIG. 2 about the axis of corresponding hollow shaft 24. In other words, each holding arm 28 is rotated counterclockwise about the axis of cigarette F while it holds cigarette F. As a result, upon rotation of disc 22, each holding arm 28 is revolve round the axis of disc 22 and at the same time rotated about the axis of corresponding hollow shaft 24. Each arm 28 is rotated once while it is moved from first rotational angle position P1 to second rotational angle position P2, and is rotated once while it is moved from position P2 to position P1, as described above. Assuming that each arm 28 is revolved in the manner described above, when it reaches first or second rotational angle position P1 or P2, its groove 30 can be caused to reliably face outward the radial direction of disc 22. As a result, supply of cigarette F from feed roller 38 to each holding arm 28 and pickup of cigarette F from each arm 28 to pickup roller 72 can be reliably performed.

Referring again to FIG. 1, the perforating apparatus has laser generating source 118 arranged at the other end side of hollow shaft 16. Laser generating source 118 can emit circular laser beam L into hollow shaft 16 at a predetermined pulse separation. The optical axis of beam L coincides with the axis of hollow shaft 16.

Perforating head 120 is mounted on one end of hollow shaft 16. Perforating head 120 has circular housing 122 coaxial with shaft 16. Housing 122 and the interior of shaft 16 communicate with each other.

Circular reflecting mirror 124 is fixed on an inner end face of housing 122 opposing one end of hollow shaft 16 and is coaxial with the axis of shaft 16.

An end face of reflecting mirror 124 opposing one end of hollow shaft 16 forms a regular polygonal pyramid having twelve reflecting surfaces 130 as apparent from FIG. 2. Reflecting surfaces 130 of reflecting mirror 124 are paired with corresponding holding arms 28 of disc 22. Therefore, even when disc 22 is rotated, reflecting surfaces 130 of reflecting mirror 124 are rotated together with hollow shaft 16 to constantly oppose corresponding holding arms 28. Furthermore, as apparent from FIG. 1, each reflecting surface 130 of reflecting mirror 124 is inclined with respect to the axis of shaft 16 by a predetermined angle. Therefore, each reflecting surface 130 can reflect the laser beam toward corresponding holding arm 28. Twelve windows 132 paired with corresponding reflecting surface 130 are formed in the circumferential surface of housing 122 of perforating head 120 to be spaced apart from one another in the circumferential direction of housing 122. As a result, laser beam L reflected by each reflecting surface 130 of reflecting mirror 124 passes through corresponding window 132 of housing 122 and is directed toward corresponding holding arm 28.

Focusing lens 126 is arranged in one end portion of hollow shaft 16. Focusing lens 126 focuses laser beam L, reflected by each reflecting surface 130 of reflecting mirror 124, on the outer periphery of filter Fa of cigarette F held by corresponding holding arm 28. In other words, the focal point of focusing lens 126 is located on the outer periphery of filter Fa projecting from each holding arm 28.

With the perforating apparatus described above, while cigarette F held by each holding arm 28 is conveyed by rotation of disc 22, laser beam L can be focused on the outer periphery of filter Fa of cigarette F by focusing lens 126 and reflecting surface 130 of reflecting mirror 124, so that a hole is formed in the outer periphery of filter Fa.

Figures 4, 5:
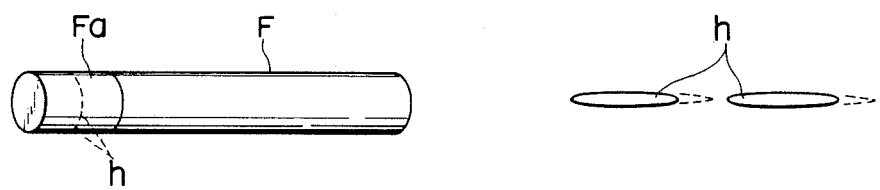
FIG. 4 is a perspective view of filter cigarette.
FIG. 5 is an enlarged view of a single hole formed in the filter.

Furthermore, cigarette F held by each holding arm 28 is rotated once about its axis while it is conveyed from first rotational angle position P1 to second rotational angle position P2. Therefore, when the pulse separation of laser beam L emitted by laser generating source 118 is set at a predetermined value, a plurality of holes h can be formed in the outer periphery of filter Fa of cigarette F at predetermined intervals, as shown in FIG. 4.

According to the perforating apparatus of the present invention, each holding arm 28 conveyed by the rotation of disc 22, i.e., each filter Fa constantly opposes corresponding reflecting surface 130 of reflecting mirror 124. Therefore, no difference occurs between the angular speeds of filter Fa and corresponding reflecting surface 130 during perforation described above. As a result, the pulse fall time of laser beam L is not adversely affected by angular speed difference, and the interval of holes h formed in the outer periphery of filter Fa, the length of holes h in the circumferential direction, and the shape of holes h can be maintained constant. As a result, formed hole h will not substantially drag, as indicated by a broken line in FIG. 5. These problems do not occur even when the angular speed of disc 22 is increased to increase the productivity of filter cigarettes F per unit time. As a result, the perforating apparatus according to the present invention is very suitable as a high-speed apparatus for manufacturing filter cigarettes F.

What is claimed is:

1. A perforating apparatus for rod-shaped objects, comprising:
    a rotatable hollow shaft having two open ends;
    a disc mounted on said hollow shaft and rotated together with said hollow haft;
    a plurality of holding arms, arranged on the periphery of said disc and spaced apart from one another in the circumferential direction of said disc, for holding rod-shaped objects, each of said holding arms extending parallel to said hollow shaft, toward one open end thereof;
    a feed section for feeding rod-shaped objects to each of said holding arms when each holding arm is positioned at a first rotational angle position in the circumferential direction of said disc, by rotation of said disc, the rod-shaped object held by said holding arm having a work portion projecting from said holding arm toward one open end side of said hollow shaft;
    a pickup section for picking up the rod-shaped objects from each of said holding arm when each holding arm of said disc is positioned at a second rotational angle position, separated from the first rotational angle position by a predetermined angle in the circumferential direction of said disc;

a rotating mechanism for rotating the rod-shaped objects once about their axes when said holding arms holding the rod-shaped objects are moved from the first to the second rotational angle position by rotation of said disc;

a laser generating source for emitting a laser beam, concentric with the axis of said hollow shaft, into said hollow shaft, toward one open end of said hollow shaft and at a predetermined pulse separation; and an optical system for focusing the laser beam emitted by said laser generating source on the work portion of the rod-shaped objects held by said holding arms, said optical system including;

(i) a reflecting mirror, located on one open end of said hollow shaft, arranged to oppose the laser beam emitted from said laser generating source, and rotated about the axis of said hollow shaft, together with that shaft, at the same rotating speed as that of the disc, one end portion of said reflecting mirror, which is closer to said laser generating source, having a top facing said laser generating source, said one end portion reflecting surfaces of a number equal to that of said holding arms, each reflecting surface rotating in accordance with the rotation of the disc while facing a corresponding one of said holding arms, and said reflecting surfaces dividing the laser beam emitted from the laser generating source into beam components and reflecting the beam components toward the corresponding holding arms, and (ii) focusing means for focusing said beam components to be reflected by said reflecting surfaces onto the outer peripheries of the work portions of the rod-shaped objects when those objects are held by said holding arms. a reflecting surface.

2. An apparatus according to claim 1, wherein said focusing means has a focusing lens arranged between said laser generating source and said reflecting mirror.

3. An apparatus according to claim 2, wherein said focusing lens is arranged inside said hollow shaft.

4. An apparatus according to claim 3, wherein said optical system has a cylindrical perforating head which is mounted on one open end of said hollow shaft, communicating with the interior of said hollow shaft to define a chamber in which said reflecting mirror is to be arranged, and rotated together with said hollow shaft, and windows for passing laser beams reflected by said reflecting surfaces of said reflecting mirror therethrough are formed in an outer periphery of said perforating head and spaced apart from one another in the circumferential direction of the perforating head.

5. An apparatus according to claim 1, wherein said laser generating source emits a circular laser beam coaxial with said hollow shaft.

6. An apparatus according to claim 5, wherein said reflecting mirror is arranged to be coaxial with said hollow shaft.

* * * * *